A. M. BLACK & J. BABCOCK
Combined Check Rower and Dropper Mechanism.

No. 199,020. Patented Jan. 8 1878.

UNITED STATES PATENT OFFICE.

ALBERT M. BLACK AND JAMES BABCOCK, OF DECATUR, ILLINOIS.

IMPROVEMENT IN COMBINED CHECK-ROWER AND DROPPER MECHANISM.

Specification forming part of Letters Patent No. 199,020, dated January 8, 1878; application filed October 20, 1877.

*To all whom it may concern:*

Be it known that we, ALBERT M. BLACK and J. BABCOCK, of Decatur, in the county of Macon and State of Illinois, have invented a new and valuable Improvement in Combined Check-Rower and Dropper Mechanisms; and we do hereby declare that the following is a full, clear, and exact description of the construction and operation of the same, reference being had to the annexed drawings, making a part of this specification, and to the letters and figures of reference marked thereon.

Figure 1:
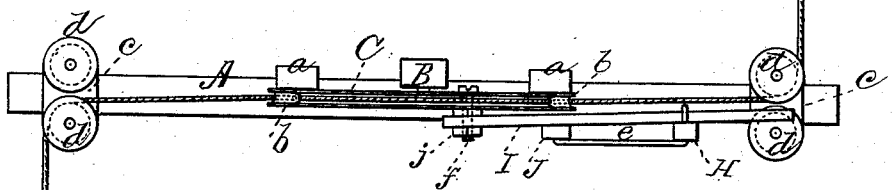
Figure 2:
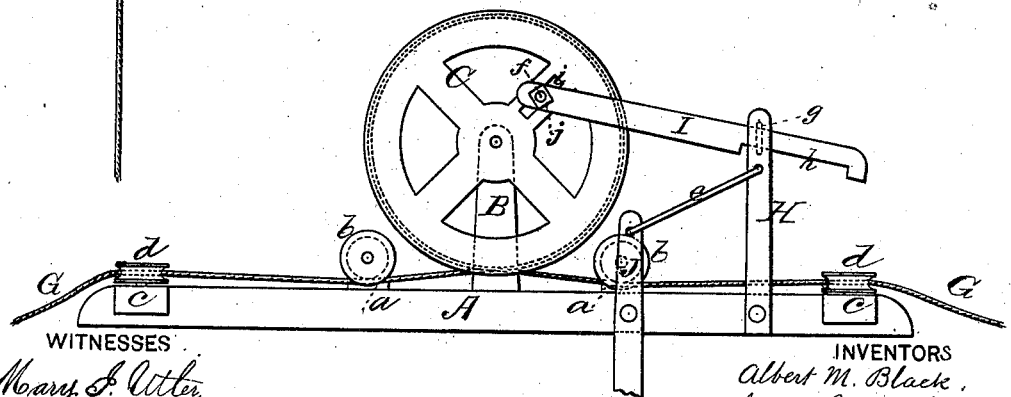

Figure 1 of the drawings is a representation of a plan view of our invention, and Fig. 2 a side view thereof.

Our invention has relation to improvements in mechanisms for operating the dropper-slides of corn-planters, and at the same time spacing or laying off the rows.

The nature of the invention will be clearly seen from the following description, and set forth in the claim appended thereto.

In the annexed drawings, the letter A designates the base-beam of my improved marker and seed-dropper, that is designed to be secured to the hounds or tongue of a corn or seed planter in any suitable manner. At or near the middle of the length of this beam a standard, B, is erected, in the upper end of which is suitably journaled a grooved pulley-wheel, C. At each side of the standard a shorter upright, $a$, is erected, carrying in its upper end a small grooved pulley, $b$. At each end of the beam A a horizontal cross-piece, $c$, is rigidly secured, having at each end a grooved pulley-wheel, $d$.

The functions of the pulleys $b$ $d$ will be explained hereinafter.

G represents a cord or rope of suitable strength, one end of which is staked down at one side of the field to be planted, and then extended across the same to the planter at the opposite side thereof and drawn taut. Its free end is then passed between pulleys $d$, under pulley $b$, over or around the large or driving pulley C, to and under the second pulley $b$, out between the pulleys $d$ at the other end of the beam A. It is then staked down to the edge of the field. If, now, the planter be started this rope will impart rotary motion to the wheel C, that is connected with a vibrating lever, H, by means of a pitman, I.

The lever H is connected by means of a rod, $e$, to a vibrating lever, J, which, through suitable connections, actuates the dropper-slides of a planter. The wrist-pin $f$ of wheel C is applied in a radial slot, $i$, formed in the latter, and is adjustable to or from the center of the said wheel, to shorten or increase the stroke of the pitman I, by means of a clamp-nut, $j$, applied upon the projecting screw-threaded end of the pin $f$. The pitman extends through a staple, $g$, upon the lever, and has an oblong rectangular notch, $h$, upon its under side, which engages the lower arm of the staple. The effect of this notch is to produce an intermittent motion of the dropper, and cause two hills of seed to be dropped at each revolution of the wheel C at an interval apart.

On reaching the opposite side of the field the planter-runners are thrown out of the ground, the stake confining this end of the rope G is drawn up out of the ground, and the planter turned without removing the said rope from the drive-wheel. The heel of the planter is then placed opposite the last hill planted, and the stake driven into the ground, as before.

It is evident that the distance of the rows apart will be the length of the beam A, and that, by placing the latter at a greater or less inclination to the beam, the rows may be spaced at pleasure.

It is also evident that in going back across the field the rope G is transferred to those of pulleys $d$ which were not in use in crossing the same automatically. There is, therefore, no necessity for shifting this rope at every change of direction, and as but one of the rope-stakes is changed at each turn, but one hand is required to operate the device.

We are aware that a drive-wheel having a rope passing over and around said wheel is not new; hence, we make no claim to such devices.

What we claim as new, and desire to secure by Letters Patent, is—

In a check-rower, the dropping mechanism, having the notched pitman I, the vibrating lever H, drop-lever J, and connecting-rod e, in combination with the slotted drive-wheel C, substantially as specified.

In testimony that we claim the above we have hereunto subscribed our names in the presence of two witnesses.

ALBERT M. BLACK.
JAMES BABCOCK.

Witnesses:
J. J. BOHS,
R. N. HAM.